United States Patent Office 2,870,019
Patented Jan. 20, 1959

2,870,019

THERAPEUTIC COMPOSITION

Curtis E. Meyer, Galesburg, Mich., assignor to The Upjohn Company, Kalamazoo, Mich., a corporation of Michigan No Drawing. Application September 16, 1954
Serial No. 456,637

7 Claims. (Cl. 99—123)

This invention relates to a therapeutic fat product, and more particularly relates to an improved therapeutic fat product utilizing a polyalkylene glycol as an emulsifying agent.

The use of a therapeutic fat product to supplement the diet of those suffering from various illnesses is now well established in the medical field. One example of an oral form of such a product may be found in U. S. Patent 2,646,354. Since such products have enjoyed considerable success, a determined effort was made not only to improve such products for oral use but also to provide such a product which is suitable for intravenous use. For obvious reasons it is often desirable to administer a therapeutic fat product by the intravenous route. The product of U. S. Patent 2,646,354 has not been satisfactory for intravenous use since the fat in such a product is not readily cleared from the blood. Among other things, a successful product in this field must contain fat which is rapidly cleared from the vascular system, give a low thermogenic response upon injection, and be physically stable over long periods of time.

It is therefore an object of this invention to provide an improved therapeutic fat product. It is also an object of this invention to provide such a product which is easier to emulsify and has greater physical stability. A further object is the provision of such a product which is suitable for intravenous as well as oral use. Still another object is the provision of such a product which has negligible pyrogenic effect upon intravenous administration. Still another object is the provision of a product giving better fat clearance from the vascular system. Other objects will be apparent to one skilled in the art to which this invention pertains.

The foregoing and additional objects have been accomplished by the substitution of a polyalkylene glycol for emulsifying agents previously used. In a broad sense the composition of the present invention comprises a fixed, metabolizable oil stably suspended in water with or without sugar through the use of a polyalkylene glycol as an emulsifying agent. More particularly the invention consists essentially of the discovery of the suitability of an ethylene oxide-polypropylene glycol condensation product as a stabilizing agent for a therapeutic fat product which is suitable for intravenous as well as oral use. The condensation product can also be characterized as a polyalkylene glycol in which the alkylene units consist of ethylene and propylene units, said propylene units being in non-terminal positions and connected to each other in a chain.

The metabolizable, fixed oils suitable for the composition of the present invention include naturally occurring vegetable and animal oils as well as synthetic oils. Among those found to be most suitable are olive oil, peanut oil, coconut oil, sesame oil, cotton seed oil, corn oil, and the like. Olive oil and cotton seed oil are preferred for intravenous use, and a combination of peanut oil and coconut oil is preferred for oral use. The coconut oil is preferred solely for its flavor characteristics.

The physical stability of emulsions of these oils is important. Particles of these oils should be less than about 2.5 microns in diameter and preponderantly about 0.5 micron in diameter. These particle sizes should be maintained under various conditions considered valid indicators of physical stability.

Suitable sugars are the monosaccharides such as glucose and fructose and the disaccharides such as sucrose and maltose. The caloric value of the saccharides is about the same. In the oral product the quantity of sugar considered desirable is in part dependent upon its sweetness. Disaccharides, such as sucrose and maltose, being sweeter and having more flavor are preferably present in smaller quantities than the monosaccharides, such as glucose and fructose, in the oral product.

The ethylene oxide-polypropylene glycol condensation products of the composition of the present invention are a well-defined group of chemical compounds. These products are represented by the following formula:

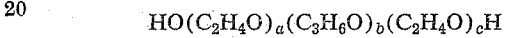

$$HO(C_2H_4O)_a(C_3H_6O)_b(C_2H_4O)_cH$$

wherein $a$, $b$ and $c$ are positive integers which can be varied over a considerable range to provide an inherently flexible group of compounds which can be adjusted to many situations. Thus the molecular weight of either the hydrophobic base (propylene oxide portion) or of the hydrophilic portions (ethylene oxide portions) can be varied in small increments over a wide range. It is therefore possible to prepare a product to meet any requirement of molecular weight or of hydrophobic-hydrophilic balance. Within the limitations inherent in the preferred composition of the present invention, it is desirable to use a formula having a base molecular weight between about 1500 and about 1800 with between about eighty and about ninety percent ethylene oxide in the molecule. The "base" is the polypropylene glycol unit. Such a formula can also be designated by reference to the structural formula as one in which $b$ equals between about 25 and about 32 and $a+c$ equals between about 136 and about 368.

Such a product is designated by the manufacturer (Wyandotte Chemicals Corporation) and herein as Pluronic F68. The "F" designates the flake form. The compounds are also available in liquid and paste form.

In addition to the Pluronics it is preferred to use phosphatides (lecithin) to improve the suspension and stabilization characteristics of the composition of the present invention. For the intravenous product the lecithin should be used in purified form to minimize the possibility of systemic reactions thereto.

Other ingredients include an anti-oxidant to prevent oxidation of the oils during processing and rancidity during storage. Edible antioxidants of the phenolic type such as tertiary butyl anisoles and the like are suitable. It is preferred to use a combination of tertiary butyl-4-hydroxy anisole, propylgallate, and citric acid.

The concentrations of the various ingredients which can be utilized in the present invention can be varied over a wide range. However the desirable overall characteristics tend to limit somewhat the permissible variations in the concentration of particular ingredients. One such characteristic is the caloric value of the fat and sugar in any particular combination. Other such characteristics are limitations associated with the route of intended administration, such as the oral route as opposed to the intravenous route. Another characteristic which tends to limit the amount of ingredients is the viscosity of the suspension. When the weight of the oil amounts to more than about 55 percent of the total weight/volume of the product, the viscosity of the suspension is so high that it is no longer free flowing and easily consumed. The viscosity can of course be higher for the oral product than for the parenteral product. Thus the upper limit for intravenous use would be about forty percent weight/volume. For the oral product the caloric value is so low when the weight of oil in the product is below about thirty percent weight/volume that the increased volume required becomes an increasing handicap. The caloric value for an intravenous product need not be as high as an oral product. Thus the lower limit for the intravenous product is about ten percent weight/volume. The preferred concentration of oil is about forty percent weight/volume for oral use and fifteen percent weight/volume for intravenous use. From the standpoint of sweetness and caloric value (which set an upper and lower limit respectively) between about five and about 25 percent weight/volume of the water used in the oral product of the present invention can be a sugar. Between about five and about fifteen percent weight/volume is preferred for the disaccharides and between about ten to twenty percent weight/volume is preferred for the monosaccharides. For the intravenous product between about three percent and ten percent weight/volume of the water is preferred.

Once the concentrations of the oils and sugars have been fixed within the ranges specified above, the concentration of the preferred Pluronic can be varied from about 0.5 to about 1.5 percent weight/volume for the oral product and from about 0.2 to about 0.5 percent weight/volume (0.3 percent preferred) for the intravenous product. The concentration of the phosphatides for intravenous use can be varied between about one to about three percent weight/volume, and the concentration for oral use should be at least about two percent weight/volume. Thus, the amounts of Pluronic and phosphatides utilized in the composition of the present invention is important once the amounts of oil and sugar are determined.

The following examples are illustrative of the compositions of the present invention but are not to be construed as limiting. The parts and percentages are on a weight/volume basis unless otherwise specified.

EXAMPLE 1.—ORAL PRODUCT

In order to make up a 100,000 cubic centimeter batch of an oral product, the following types and amounts of ingredients should be used:

| | |
|---|---:|
| 10% dextrose anhydrous _____grams__ | 10,000 |
| 1.5% Pluronic F68 _____do____ | 1,500 |
| 2% lecithin (Glidden Lecithin Grade RG) grams__ | 2,000 |
| 0.1 sodium benzoate _____do____ | 100 |
| 0.05% disodium ethylene diamine tetra-acetate grams__ | 50 |
| 36% peanut oil, U. S. P. crackerjack grade grams__ | 36,000 |
| 4% coconut oil _____do____ | 4,000 |
| .008% tertiary butyl-4-hydroxy anisole (Sustane, Universal Oil Products) _____grams__ | 8 |
| Deionized water _____cc__ | 47,500 |

The water is heated to a temperature of 95 degrees centigrade. The following materials are dissolved in order in the water: dextrose, lecithin, Pluoronic, sodium benzoate and disodium ethylene diamine tetra-acetate. The solution is stirred for twenty minutes. The butyl anisole is dissolved in the coconut and peanut oils. The oils are added to the solution, and the temperature is adjusted to seventy degrees centigrade. The whole is then homogenized by two passes through a Manton Gaulin homogenizer. The product is then filled, while still warm, into pint bottles.

The product is assayed for fat content, dextrose content, stability (centrifuge test) and bacteria count.

EXAMPLE 2.—INTRAVENOUS PRODUCT 200,000 cubic centimeters of an intravenous fat product contains the following types and amounts of ingredients:

| | Grams |
|---|---:|
| 1.2% Lecithin (Glidden Lecithin Grade RG, purified) _____ | 2,400 |
| 15% olive oil, U. S. P _____ | 30,000 |
| 4% dextrose, anhydrous _____ | 8,000 |
| 0.3% Pluronic F68 _____ | 600 |
| Water for injection—sufficient to make up 200,000 cc. | |

The lecithin is purified to minimize reactions to possible impurities by dissolving in petroleum ether, filtering and precipitating with acetone. The day before manufacturing add an excess of water to two tanks and bring to an active boil for ten minutes. The steam is turned off. Lecithin is added to the oil contained in a partially jacketed steam kettle; and, while stirring rapidly, the temperature is raised to sixty degrees centigrade in ten minutes. After the lecithin is dissolved, the temperature is reduced to 25 degrees centigrade. The oil is allowed to stand overnight.

The water is adjusted to approximately eighty liters in tank No. 1 and eighty liters in tank No. 2. The temperature is raised in tank No. 1 to ninety degrees centigrade. Dextrose followed by the Pluronic is added. The mixture of oil and lecithin is added. Sufficient water is added to tank No. 1 to bring the level up to 120 liters. This is mixed thoroughly for five minutes by rapid stirring with a Lightening Mixer while cooling to seventy degrees centigrade, and homogenized at 4000 pounds per square inch, for twenty minutes at seventy degrees centigrade, recycling into tank No. 1. Water is added from tank No. 2 at seventy degrees centigrade. With pressure at 4000 pounds per square inch the contents of tank No. 1 are homogenized into tank No. 2. This cycle is repeated two more times, and the product is filled into 600 cubic centimeter centrifuge bottles after passing through a sintered glass filter. The product is then autoclaved at 121 degrees centigrade for twenty minutes and cooled as rapidly as possible.

The product is assayed for pyrogens, sterility, fat content and dextrose content.

EXAMPLE 3.—COMPARISON OF PYROGENS AND PHYSICAL STABILITY

Following the procedure of Example 2 several lots of two main types of intravenous preparations were checked for pyrogen response and physical stability. The results of these tests can be found in Tables I and II.

Pyrogens are run on each lot of emulsion according to the procedures of the United States Pharmacopoeia. Briefly, three rabbits (1500 grams or more) are infused through an ear vein with ten cubic centimeters of fat product per kilogram of rabbit within fifteen minutes after obtaining the normal rectal temperature. Time for infusion is approximately three–four minutes. The normal rectal temperature is that obtained fifteen minutes after placing the rabbits in stocks. Rectal temperatures are obtained at three one hour intervals following the injection and the highest is compared with the normal. According to the U. S. P. definition a positive reaction is a rise of 0.6 degree centigrade or more in one of the three rabbits used, or a sum total of 1.4 degrees centigrade rise in all three rabbits used. If positive for three rabbits, five rabbits are employed; and a positive reaction is redefined as one in which two or more of the rabbits show a rise of 0.6 degree centigrade or more.

The emulsions shown in Table I are not satisfactory. However, most of the Pluronic emulsions shown in Table II pass the U. S. P. definition of a negative reaction, and those that don't are so marginal that they would very likely pass on the repeat test.

*Table I*
SUMMARY OF DEMAL EMULSIONS [1]

| Lot Number | Pyrogens Max. °C. Temperature rise in 3 hrs. | | Evaluation [2] | | | |
|---|---|---|---|---|---|---|
| | | | Initial | | Shaken | |
| | Initial | Repeat | 1.6μ or more | 3.2μ or more | 1.6μ or more | 3.2μ or more |
| 3 | 1,.2,.8,.8 | .3,.2,.0,1.0,0,1.5,.8,1.0,.1,.7 | 4.0 | 0.1 | 33 | 0.5 |
| 4 | .2,1.2,.6 | .6,.3,.0,.0,.0 | 4.0 | 0 | | |
| 5 | .0,.5 | .6,.1,.5 | 4.5 | 0.2 | 26.7 | 0.2 |
| 6 | .3,.0,.0 | | 3.7 | 0.1 | 31.9 | 0.9 |
| 7 | .4,.4,.7 | .4,.5,.3,.0,.0 | 3.2 | 0.2 | 27.4 | 1.6 |
| 8 | .4,.2,.6 | .5,.4,.4,.6,.3 | 5.0 | 0 | 35.0 | 1.2 |
| 9 | .8,.9,.4 | .8,.9,.4,.5,.6 | 5.0 | 0.2 | 33.4 | 0.5 |
| 10 | 1.2,.4,.6 | .6,.2,.3 | 7.0 | 0.4 | 30.0 | 0.4 |
| 11 | .6,.4,.2 | .9,.6,.6 | 5.0 | 0.2 | 38.8 | 0.6 |
| 12 | .9,.4,.8 | .5,.0,.5 | 4.4 | 0.1 | 34.4 | 1.4 |
| 13 | .5,.6,.4 | .6,.3,.5 | 4.8 | 0.3 | 36.0 | 0.7 |
| 14 | .0,1.3,.4 | .2,.0,.0 | 4.3 | 0.3 | 25.0 | 0.5 |
| 15 | .9,.0,.5 | .5,.7,.2 | 4.7 | 0.4 | 27.0 | 0.2 |
| 16 | .6,.6,1.0 | .0,.6,1.0 | 3.8 | 0.2 | 21.0 | 0.2 |
| 17 | .3,.6,.9 | | 5.5 | 0.4 | 35.0 | 2.6 |
| Averages | | | 4.6 | 0.2 | 33 | 0.8 |

[1] Formulas of all these preparations are 1% polyglycerol ester of oleic acid (manufactured by Emulsol Corporation), 1% purified phosphatide and 15% olive oil.
[2] Evaluation explained below.

*Table II*
SUMMARY OF PLURONIC EMULSIONS [1]

| Lot Number | Pluronic, Percent | Purified Phosphatide, Percent | Pyrogens Max. °C. Temp. Rise in 3 hrs. | Evaluation [2] | | | |
|---|---|---|---|---|---|---|---|
| | | | | Initial | | Shaken 72 hrs. at 4° C. | |
| | | | | 1.6μ or more | 3.2μ or more | 1.6μ or more | 3.2μ or more |
| 3 | 0.5 | 1.0 | .4,.4,.0 | 20.5 | 0.2 | 26.7 | 0.2 |
| 4 | 0.5 | 1.0 | .0,.5,.0 | 8.9 | 0.5 | 11.7 | 0.5 |
| 5 | 0.5 | 1.2 | .4,.6,.4 | 5.5 | 0.1 | 10.6 | 0.7 |
| 6 | 0.2 | 1.2 | .2,.6,.1 | 6.0 | 0.1 | 26.9 | 1.2 |
| 7 | 0.5 | 1.0 | .3,.4,0 | 5.0 | 0.1 | 16.0 | 0.3 |
| 8 | 0.3 | 1.0 | .4,0,.4 | 12.9 | 0.8 | 15.9 | 1.1 |
| 9 | 0.3 | 1.0 | .0,.0,.2 | 14.4 | 0.6 | 16.0 | 1.4 |
| 10 | 0.3 | 1.0 | .6,0,0 | 8.4 | 0 | 13.1 | 0.9 |

[1] All formulas contain 15% olive oil.
[2] Evaluation explained below.

The portion of Tables I and II entitled "Evaluation" summarizes the data obtained to indicate the physical stability of the emulsions. This data was obtained by evaluating each lot of fat emulsion before and after it is shaken 72 hours at four degrees centigrade. A five milliliter sample is withdrawn from the center of the bottle of emulsion (inverted five times to mix well) and diluted to 25 cubic centimeters with five percent dextrose. This dilution is used to fill a Petroff-Hauser bacterial counting chamber. Using oil immersion, a count of the fat particles 1.6 microns or more in diameter and also 3.2 microns or more in diameter in ten areas 1/50 square millimeter in size is made. The average is recorded as the value for that particular sample. This value multiplied by 12.5 million yields the count per milliliter of emulsion. The sampling in this test is sufficient to give a valid indication of physical stability.

Table III represents data on the pyrogens of Pluronic and Demal emulsions. This information not only verifies the superiority of the Pluronic over the Demal emulsions as indicated by the previous experiments, but it also gives a more accurate comparison of the pyrogenic effect of the emulsifying agents used. The first two emulsions tested were different lots varying only as to the emulsifying agent. The average rise in temperature clearly indicates that the Pluronic emulsion is superior to the Demal emulsion. To verify this result one percent of each of the two emulsifying agents was added to the same lot of material. The average rise in temperature clearly indicates that the Demal caused a greater pyrogenic response than the Pluronic emulsifier. This was further verified by testing the pyrogenic effect of a one percent concentration of Demal in five percent dextrose solution. The data conclusively indicate that the Pluronic emulsions are superior to the Demal emulsions from the standpoint of pyrogenic response.

Table III

[Demal 14 vs. Pluronic F-68 as coemulsifier in 15% olive oil emulsion with respect to temperature. Responses obtained following I. V. administration to rabbits.]

| Rabbit No. | 1% Demal Emulsion—Lot No. 17 | | | .3% Pluronic Emulsion—Lot No. 9 | | | .3% Pluronic Emulsion—Lot No. 9+1% Pluronic F-68 | Pluronic Emulsion—Lot No. 9+1% Demal | 1% Demal [1] |
|---|---|---|---|---|---|---|---|---|---|
| | Ave. °C. Rise | No. Run | Range, °C. Rise | Ave. °C. Rise | No. Run | Range, °C. Rise | °C. Rise | °C. Rise | °C. Rise |
| 58 | 0.94 | 4 | 0.44-1.34 | 0.46 | 5 | 0.23-0.72 | 0.56 | 1.72 | |
| 59 | 0.66 | 4 | 0.33-1.00 | 0.23 | 1 | 0.23 | 0.67 | 2.51 | |
| 60 | 0.77 | 9 | 0.50-1.11 | 0.41 | 5 | 0.23-0.56 | 0.16 | 1.11 | |
| 61 | 1.78 | 9 | 0.94-2.28 | 0.92 | 5 | 0.39-1.44 | 0.56 | 2.05 | 1.05 |
| 62 | 1.05 | 9 | 0.67-1.61 | 0.36 | 5 | 0.16-0.50 | 0.22 | 1.45 | 0.22 |
| 63 | 1.86 | 9 | 1.05-2.33 | 1.21 | 5 | 0.61-1.62 | 0.77 | 1.45 | 0.67 |
| 64 | 0.49 | 9 | 0.06-0.83 | 0.29 | 5 | 0.17-0.39 | 0.44 | 1.16 | 0.78 |
| 65 | 0.70 | 9 | 0.39-1.00 | 0.27 | 5 | 0.11-0.56 | 0.11 | 0.73 | 1.11 |
| 66 | 1.46 | 9 | 0.78-1.89 | 0.91 | 5 | 0.67-1.23 | 0.53 | 2.17 | 1.00 |
| 67 | 0.55 | 8 | 0.23-1.11 | 0.42 | 5 | 0.34-0.50 | 0.50 | 1.17 | 0.94 |
| 68 | 1.02 | 8 | 0.73-1.62 | 0.57 | 5 | 0.45-0.83 | 0.44 | 1.33 | 0.89 |
| 69 | 1.96 | 8 | 1.55-2.28 | 1.28 | 4 | 0.89-1.50 | | | |
| 70 | 1.11 | 8 | 0.78-1.72 | 0.67 | 5 | 0.50-0.83 | 0.55 | 1.23 | 0.73 |
| Overall average °C. Rise | 1.19 | | | 0.61 | | | 0.46 | 1.50 | 0.82 |

[1] 1% Demal in 5% dextrose solution, all other ingredients eliminated.

Other reasons for preferring the Pluronic emulsion over the Demal emulsion are as follows: the Pluronic emulsion produces no deposition of intravascular fat in rats while Demal emulsions almost always produce such a deposition of fat in rats (tests run in heart, liver, kidney, spleen and lung); the Demal formulas indicate a higher reaction rate in clinical trials by several different investigators while clinical experience with Pluronic emulsions on the other hand has been good. Standard toxicity tests which have been run in rats have proven the Pluronic formula to be non-toxic at the levels tested and in the amounts utilized in the compositions of the present invention.

Certain emulsifying agents have been used in the emulsifying systems of some commercially available oral therapeutic fat products. While apparently satisfactory in an oral product, they have proven unsatisfactory in products intended for intravenous use. One reason for this is the unsatisfactory thermogenic response obtained from injection of these materials. Table IV shows the reaction obtained in a test group of five rabbits from one percent solutions of polyoxyalkylene ether of partial stearic acid ester (Agent A) and polyoxyalkylene ether of partial oleic acid ester (Agent B) both with five percent dextrose. Each figure represents the average maximum rise in degree centigrade occurring during the four hours following infusion.

Table IV

| Agent A | Agent B |
|---|---|
| 0.89 | 2.16 |
| 0.84 | 1.11 |
| 1.27 | 2.33 |
| 0.55 | 1.27 |
| 1.50 | 2.22 |
| Average 1.01 | Average 1.82 |

Thus agents A and B would not be an improvement over the oleic acid ester emulsifying agent on the bases of pyrogenic response.

It is important that the emulsified oil in an intravenous fat product be cleared from the blood at a rapid rate. This problem is dealt with by Waddell et al., Am. J. Physiol. 174: 39–42 (July 1953). It is there reported that the rate of clearance of triglyceride oils is influenced by the emulsifying agents used. The co-emulsifier disclosed and claimed in U. S. Patent 2,646,354, i. e., polyethylene glycol ether, is shown to decrease the rate of disappearance of emulsion from the blood. This decrease is serious enough to be referred to as "a first order reaction." The product of the present invention has exhibited no adverse effects in this respect, either in animal or clinical use.

It is to be understood that the invention is not to be limited to the exact details of operation or exact compositions shown and described, as obvious modifications and equivalents will be apparent to one skilled in the art, and the invention is to be limited only by the scope of the appended claims.

I claim:

1. A therapeutic fat product suitable for oral and intravenous use comprising a metabolizable, non-toxic, fixed oil and a sugar in an aqueous vehicle with a minor proportion of an ethylene oxide-polypropylene glycol condensation product as an essential emulsifier capable of imparting physical stability to the emulsion without causing excessive toxicity.

2. The product of claim 1 wherein the ethylene oxide-polypropylene glycol condensation product has a base unit with a molecular weight between about 1500 and about 1800 with between about eighty and about ninety percent ethylene oxide in the molecule.

3. A therapeutic fat product suitable for oral and intravenous use comprising a caloric portion consisting essentially of a metabolizable, non-toxic, fixed oil and a sugar stabilized in an aqueous vehicle by the use of minor proportions of an ethylene oxide-polypropylene glycol condensation product and phosphatides.

4. An oral therapeutic fat product comprising from about thirty to about 55 percent weight/volume of an edible, bland, non-toxic, fixed oil, from about five to about 25 percent weight/volume of the water of a sugar, from about 0.5 to about 1.5 percent weight/volume of an ethylene oxide-polypropylene glycol condensation product having a base unit with a molecular weight between about 1500 and about 1800 with between about eighty and about ninety percent ethylene oxide in the molecule, about two percent weight/volume of soybean phosphatides and water.

5. An oral therapeutic fat product comprising about 36 percent weight/volume of peanut oil, about four percent weight/volume of coconut oil, about ten percent weight/volume of dextrose, about 1.5 percent weight/volume of an ethylene oxide-polypropylene glycol condensation product having a base unit with a molecular weight between about 1500 and about 1800 with between about eighty and ninety percent ethylene oxide in the molecule, about two percent weight/volume lecithin, and water.

6. An intravenous therapeutic fat product comprising from about ten to about forty percent weight/volume of a metabolizable, non-toxic, fixed oil, from about three to about ten percent weight/volume of the water of a sugar, from about 0.2 to about 0.5 percent weight/volume of an ethylene oxide-polypropylene glycol condensation product having a base unit with a molecular weight between about 1500 and about 1800 with between about eighty and ninety percent ethylene oxide in the molecule, from about one to about three percent weight/volume of purified lecithin, and water.

7. An intravenous therapeutic fat product comprising about fifteen percent weight/volume of olive oil, about four percent weight/volume of dextrose, about 0.3 percent weight/volume of an ethylene oxide-polypropylene glycol condensation product having a base unit with a molecular weight between about 1500 and about 1800 with between about eighty and ninety percent ethylene oxide in the molecule, about 1.2 percent weight/volume of lecithin, and water.

References Cited in the file of this patent

UNITED STATES PATENTS 2,646,354   Wachtel et al. _____ July 21, 1953
2,674,619   Lundsted _____ Apr. 6, 1954

OTHER REFERENCES

Meng, H. C. and Freeman, S.: "Journal of Laboratory and Clinical Medicine," 1948, vol. 33, pp. 689, 690, 701, 702 and 705.

"Chemical and Engineering News," vol. 28, No. 40, October 2, 1950, p. 3428.

"Journal Lab. and Clinical Medicine," vol. 34, 1949, pp. 1627 and 1633.

"Am. J. Surgery," vol. 88 (1954), pp. 698–702.

"Lab. and Clin. Med.," vol. 39 (1952), pp. 176–183.

"Lab. and Clin. Med," vol. 43 (1954), pp. 752–758.